US010576457B2

(12) United States Patent
Deshmukh et al.

(10) Patent No.: US 10,576,457 B2
(45) Date of Patent: Mar. 3, 2020

(54) ALUMINA AND ALUMINA EXTRUDATES AND PROCESS FOR PREPARATION THEREOF

(71) Applicant: RELIANCE INDUSTRIES LIMITED, Mumbai, Maharashtra (IN)

(72) Inventors: Amit Arvind Deshmukh, Maharashtra (IN); Sandip Sahebrao Deshmukh, Maharashtra (IN); Sanket Shamsunder Salgaonkar, Maharashtra (IN); Govind Sethia, Madhya Pradesh (IN)

(73) Assignee: RELIANCE INDUSTRIES LIMITED, Mumbai, Maharashtra (IN)

( * ) Notice: Subject to any disclaimer, the term of this patent is extended or adjusted under 35 U.S.C. 154(b) by 0 days.

(21) Appl. No.: 15/918,191

(22) Filed: Mar. 12, 2018

(65) Prior Publication Data

US 2018/0264439 A1    Sep. 20, 2018

(30) Foreign Application Priority Data

Mar. 14, 2017  (IN) .............................. 201721008814

(51) Int. Cl.
| | |
|---|---|
| *B01J 21/04* | (2006.01) |
| *B01J 23/02* | (2006.01) |
| *C01F 7/02* | (2006.01) |
| *C01F 7/34* | (2006.01) |
| *C01F 7/36* | (2006.01) |
| *C10G 45/00* | (2006.01) |
| *B01J 37/02* | (2006.01) |
| *B01J 23/883* | (2006.01) |
| *B01J 37/00* | (2006.01) |
| *B01J 35/10* | (2006.01) |
| *B01J 37/03* | (2006.01) |
| *B01J 37/04* | (2006.01) |
| *B01J 37/08* | (2006.01) |

(52) U.S. Cl.
CPC .............. *B01J 21/04* (2013.01); *B01J 23/883* (2013.01); *B01J 35/1019* (2013.01); *B01J 35/1038* (2013.01); *B01J 35/1047* (2013.01); *B01J 35/1061* (2013.01); *B01J 37/009* (2013.01); *B01J 37/0009* (2013.01); *B01J 37/0018* (2013.01); *B01J 37/0207* (2013.01); *B01J 37/0236* (2013.01); *B01J 37/031* (2013.01); *B01J 37/04* (2013.01); *C01F 7/025* (2013.01); *C01F 7/026* (2013.01); *C01F 7/34* (2013.01); *C01F 7/36* (2013.01); *C10G 45/00* (2013.01); *B01J 37/08* (2013.01); *B01J 2523/00* (2013.01); *C01P 2006/12* (2013.01); *C01P 2006/14* (2013.01); *C01P 2006/16* (2013.01); *C01P 2006/21* (2013.01)

(58) Field of Classification Search
CPC .... B01J 21/04; B01J 37/0207; B01J 37/0009; B01J 37/0018; B01J 23/883; B01J 35/1038; B01J 37/031; B01J 35/1019; B01J 37/0236; B01J 37/009; B01J 35/1061; B01J 35/1047; B01J 37/04; B01J 37/08; B01J 2523/00; C10G 45/00; C01F 7/026; C01F 7/025; C01F 7/36; C01F 7/34; C01P 2006/12; C01P 2006/14; C01P 2006/16; C01P 2006/21
USPC ......................................... 502/423
See application file for complete search history.

(56) References Cited

U.S. PATENT DOCUMENTS

| | | | |
|---|---|---|---|
| 6,027,706 A * | 2/2000 | Pinnavaia | C01B 37/00 423/600 |
| 6,368,992 B1 * | 4/2002 | Beall | B28B 3/269 106/181.1 |
| 2008/0116200 A1 * | 5/2008 | Kawai | B28B 13/04 220/4.21 |

* cited by examiner

*Primary Examiner* — Haytham Soliman
(74) *Attorney, Agent, or Firm* — Collard & Roe, P.C.

(57) ABSTRACT

The present disclosure relates to an alumina having a surface area in the range of 330-400 m²/g, a pore volume in the range of 1.2-1.7 cc/g, and an average pore diameter in the range of 125-160 Å. The present disclosure also relates to alumina extrudates having a diameter in the range of 1 mm to 3 mm, a surface area in the range of 300-360 m²/g, a pore volume in the range of 0.8-1.3 cc/g and pore diameter in the range of 90-130 Å with a crushing strength in the range of 1-2.5 daN/mm. Further, the present disclosure relates to a process for the preparation of alumina and alumina extrudates. The alumina extrudates can be used as a support for catalyst preparation or as a catalyst or adsorbent in various processes. The process of the present disclosure enhances metal loading capacity, has better metal dispersion, and exhibit delay in deactivation of the catalyst due to mouth pore plugging.

8 Claims, No Drawings

US 10,576,457 B2

ALUMINA AND ALUMINA EXTRUDATES AND PROCESS FOR PREPARATION THEREOF

CROSS REFERENCE TO RELATED APPLICATIONS

Applicant claims priority under 35 U.S.C. § 119 of Indian Application No. 201721008814 filed on Mar. 14, 2017, the disclosure of which is incorporated by reference.

FIELD

The present disclosure relates to alumina and alumina extrudates and process for preparation thereof.

Definitions

As used in the present disclosure, the following terms are generally intended to have the meaning as set forth below, except to the extent that the context in which they are used indicate otherwise.

The term "Hydrotreating" as used herein refers to a process for reducing sulfur, nitrogen, and aromatics while enhancing cetane number, density, and smoke point.

The term "cetane number" as used herein refers to a quantity indicating the ignition properties of diesel fuel relative to cetane as a standard.

The term "templating agent" as used herein refers to an agent which is used to control the nucleation of inorganic clusters from an aqueous or nonaqueous solution.

The acronym "CTAB" as used herein refers to Cetyltrimethylammonium bromide, which is also known as hexadecyltrimethylammonium bromide, cetrimonium bromide, etc.

The acronym "TPABr" as used herein refers to Tetrapropylammonium bromide, which is also known as tetrapropylazanium bromide, tripropyl ammonium bromide, tetrapropylaminium bromide, etc.

The acronym "TEABr" as used herein refers to Tetraethylammonium bromide, which is also known as tetrylammonium bromide.

The acronym "TBABr" as used herein refers to Tetrabutylammonium bromide, which is also known as tetra-n-butylammonium bromide.

The acronym "P-123" as used herein refers to Pluronic P-123 which is the trade name for a triblock copolymer. The nominal chemical formula is $HO(CH_2CH_2O)_{20}(CH_2CH(CH_3)O)_{70}(CH_2CH_2O)_{20}H$, which corresponds to a molecular weight of around 5800 g/mol.

The acronym "HMDA" as used herein refers to Hexamethylenediamine, which is also known as hexane-1,6-diamine, 1,6-diaminohexane, 1,6-hexanediamine.

The acronym "PVA" as used herein refers to polyvinyl alcohol, which is also known as poly(ethenol), ethenol, homopolymer; polyviol, vinol, alvyl, alcotex, covol, gelvatol, lemol, mowiol, mowiflex, alcotex, elvanol, gelvatol, lemol, mowiol, nelfilcon a, polyviol and rhodoviol, etc The acronym "SA" as used herein refers to a surface area of calcined alumina and alumina extrudates.

The acronym "PV" as used herein refers to a pore volume of calcined alumina and alumina extrudates.

The acronym "APD" as used herein refers to an average pore diameter of calcined alumina and alumina extrudates.

The acronym "CS" as used herein refers to a single grain crushing strength of calcined alumina and alumina extrudates.

BACKGROUND

Alumina is one of the most preferred choices as catalyst support or as catalyst in most of the fixed bed processes. Synthesis of alumina with higher surface area, pore volume and with enhanced mechanical and thermal stability is one of the highly appreciated areas in academic as well as industries. The physico-chemical properties of support play a critical role in adsorption, dispersion (in some cases metal dispersion), diffusion, etc. Normal reported surface area of alumina used for hydrotreating is 280-300 $m^2/g$ with a pore volume of 0.7-1 cc/g. These physical properties further reduce while and/or after extrusion of the alumina.

In view of the increasing demand of highly active, selective, and long life-cycle catalyst, alumina extrudates with enhanced surface area, and pore volume are desirable while maintaining the required mechanical properties, which is an area of research since past few years. The improvement in surface area, pore volume and pore diameter would help in higher metal loading, better metal dispersion, and delay the deactivation of the catalyst due to mouth pore plugging.

Therefore, there remains a need to develop a process for preparing alumina and alumina extrudates that overcomes the drawbacks as described hereinabove.

OBJECTS

Some of the objects of the present disclosure, which at least one embodiment herein satisfies, are as follows.

It is an object of the present disclosure to ameliorate one or more problems of the prior art or to at least provide a useful alternative.

An object of the present disclosure is to provide alumina and alumina extrudates.

Another object of the present disclosure is to provide a process for preparing alumina and alumina extrudates.

Still another object of the present disclosure is to provide alumina and alumina extrudates having high surface area, pore volume and average pore diameter for higher loading of metals or better dispersion of metals thereon.

Other objects and advantages of the present disclosure will be more apparent from the following description, which is not intended to limit the scope of the present disclosure.

SUMMARY

The present disclosure relates to alumina. The alumina is characterized by having a surface area (SA) in the range of 330-400 $m^2/g$, pore volume (PV) in the range of 1.2-1.7 cc/g, and average pore diameter (APD) in the range of 125-160 Å.

The present disclosure further provides a process for preparing alumina which is useful as catalyst or catalyst carrier. The process includes mixing at least one alumina source in water to obtain an aqueous mixture. At least one templating agent is mixed with the aqueous mixture under stirring to obtain a gel. The pH of the so obtained gel is adjusted in the range of 4-10 followed by maintaining the pH for a time period in the range of 1 hour to 3 hours to obtain a pH adjusted gel. The so obtained pH adjusted gel is aged at a temperature in the range of 60° C. to 120° C. for 20 hours to 24 hours to obtain a precipitate. The so obtained precipitate is filtered, washed with water, followed by drying to obtain dried precipitate. The dried precipitate is calcined to obtain alumina.

The present disclosure further relates to alumina extrudates having the surface area in the range of 300-360 $m^2/g$, pore volume in the range of 0.8-1.3 cc/g, and average pore diameter in the range of 90-130 Å and process for preparing the same. The process for preparing the alumina extrudates includes mixing dried precipitate of alumina (before or after calcination) having a particle size less than 250 micron, with a binder solution to obtain a dough. The so obtained dough is extruded to obtain extrudates. The extrudates are dried, followed by calcination to obtain the alumina extrudates.

DETAILED DESCRIPTION

As described in the background section, the improvement in surface area, pore volume and pore diameter of alumina and alumina extrudates would help in higher metal loading, better metal dispersion, and will delay the deactivation of catalyst (alumina/alumina extrudates) due to mouth pore plugging. Increasing demand for highly active, selective, and long life-cycle catalyst such as alumina and alumina extrudates with enhanced surface area and pore volume is desirable while maintaining the required mechanical properties is an area of research since past few years.

The main objective of the present disclosure is to provide an improved process for the preparation of alumina having high surface area, pore volume, and pore diameter with low cost and thereafter it's extrudate having minimum losses in surface area, pore volume, and pore diameter, during the extrusion step. Therefore, the present disclosure provides a process for the preparation of alumina and alumina extrudates having an improved surface area, pore volume, and pore diameter.

In an aspect of the present disclosure, there is provided a process for preparing alumina. The alumina can be used as a catalyst or catalyst carrier. The process includes mixing at least one alumina source in water to obtain an aqueous mixture of the alumina source.

The alumina source can be at least one selected from the group consisting of aluminium hydroxide, aluminium chloride, aluminium nitrate, aluminium sulphate, aluminium iso-butoxide, and aluminium iso-propoxide. In one embodiment, the alumina source is aluminium hydroxide. The molar ratio of water with respect to the alumina source can be in the range of 20 to 60, typically 35 to 50.

At least one templating agent is mixed with the aqueous mixture of the alumina source under stirring for a time period in the range of 1 hour to 5 hours to obtain a gel. The templating agent can be at least one selected from the group consisting of nitrogen, and hydroxyl containing compound. Typically, the templating agent is at least one selected from the group consisting of cetyltrimethylammonium bromide (CTAB), tetraethylammonium bromide (TEABr), tetramethylammonium bromide (TMABr), tetrapropylammonium bromide (TPABr), tetrabutylammonium bromide (TBABr), triblock copolymers (P-123) such as Pluronic®-P123 [(Poly(ethylene glycol)-block-poly(propylene glycol)-block-poly(ethylene glycol)], hexamethylenediamine (HMDA), Starch, and poly(vinyl alcohol) (PVA). Typically, the amount of the templating agent can be in the range of 0.05 to 0.2.

The proportion of the alumina source:templating agent:water can be in the range of 1:0.05:20 to 1:0.05:60. Typically, the proportion of the alumina source:templating agent:water is 1:0.05:45.

The pH of so obtained gel is adjusted such that it is in the range of 4-10 followed by maintaining the pH of the gel to a value in the range of 4-10 for a time period in the range of 1 hour to 3 hours to obtain a pH adjusted gel. The pH of the gel can be adjusted by treating the gel with a mineral acid or a base. The mineral acid can be at least one selected from the group consisting of nitric acid, hydrochloric acid, and sulphuric acid; and the base can be ammonia. In one embodiment, the pH of so obtained gel can be in the range of 4.5-7.5.

The pH adjusted gel is aged at a temperature in the range of 60° C. to 120° C. for a time period in the range of 10 hours to 30 hours under mechanical stirring to obtain a precipitate. Typically, the aging temperature can be in the range of 70° C. to 90° C. and is maintained for a time period in the range of 20 hours to 24 hours.

The so obtained precipitate is filtered, washed with water, followed by drying at a temperature in the range of 100° C. to 120° C. for a time period in the range of 8 hours to 12 hours to obtain a dried precipitate. The dried precipitate is calcined at a temperature in the range of 350° C. to 550° C. for a time period in the range of 2 hours to 6 hours to obtain the calcined alumina, characterized by having a surface area (SA) in the range of 330-400 $m^2/g$, pore volume (PV) in the range of 1.2-1.7 cc/g, and average pore diameter (APD) in the range of 125-160 Å.

The present disclosure in another aspect relates to a process for preparing alumina extrudates having surface area in the range of 300-360 $m^2/g$, pore volume in the range of 0.8-1.3 cc/g, and average pore diameter in the range of 90-130 Å. The process for preparing the alumina extrudates includes the step of mixing dried precipitate of alumina (before or after calcination), with a binder solution to obtain a dough. Typically, the particle size of the uncalcined alumina used in the preparation of alumina extrudates can be in the range of 50 micron to 250 micron.

The binder can be at least one selected from the group consisting of polyvinyl alcohol, ethylene glycol, and starch, individually or in combination with at least one carboxylic acid. The carboxylic acid can be selected from the group consisting of acetic acid, oxalic acid, stearic acid, and citric acid. In one embodiment, the carboxylic acid is acetic acid. The amount of binder can be in the range of 0.03 wt % to 3 wt % with respect to the total stock solution. The stock solution can be prepared in water by using the binder alone or by using the binder in combination with aqueous carboxylic acid or aqueous base.

Carboxylic acid like acetic acid, oxalic acid, and citric acid can be used as a secondary binding agent in the preparation of the alumina extrudates. The amount of carboxylic acid can be in the range of 0.01-2.5% with respect to the binder stock solution used for extrusion.

The dough is mulled for 3 hours to 4 hours so that the binder is homogenously mixed with the alumina powder and the acid solution.

The so obtained dough is extruded to obtain extrudates. The extrudates are dried at a temperature in the range of 80° C. to 120° C. for a time period in the range of 8 hours to 15 hours, followed by calcination at a temperature in the range of 350° C. to 550° C. for a time period in the range of 2 hours to 6 hours to obtain the alumina extrudates. The so obtained alumina extrudates are characterized by having diameter in the range of 1-3 mm, can be in a form selected from cylindrical/3-lob/4-lob/star shape and crushing strength can be in the range of 1 daN/mm to 2.5 daN/mm.

The present disclosure provides the process for alumina preparation and it's extrusion methodology to achieve high surface area, pore volume of alumina extrudate which can be used as catalyst or catalyst support. The average surface area (SA) achieved for alumina (powder) can be in the range of 330-400 $m^2/g$, pore volume (PV) in the range of 1.2-1.7 cc/g, and average pore diameter (APD) in the range of 125-160 Å, which after extrusion changes to SA in the range of 300-360 m²/g, PV in the range of 0.8-1.3 cc/g, APD in the range of 90 Å-130 Å, depending on the templating agent and binder used. Once alumina extrudate/support is ready after drying and calcination, it can be used as catalyst or support for catalyst preparation. Various transitional, non-transitional, noble metal, alkali metals, alkaline earth metals, Lanthanides, non-metals, metalloids can be loaded on the alumina support (which can be used as catalyst) using various techniques like impregnation, wetness impregnation, precipitation, etc.

The present disclosure is further described in the light of the following laboratory experiments which are set forth for illustration purpose only, and not to be construed for limiting the scope of the disclosure. The following experiments can be scaled up to industrial/commercial scale, and the results obtained can be extrapolated to industrial scale.

EXPERIMENTAL DETAILS

Experiment 1: Preparation of Calcined Alumina in Accordance with the Process of the Present Disclosure:

300 gm of Aluminium hydroxide as alumina source was first dissolved in de-mineralized water to obtain an aqueous mixture under stirring for 1 hour. To this mixture, 41.24 gm of TEABr as templating agent (dissolved in water) was added over a time period of 60 min to obtain a gel. The so formed gel was stirred using a mechanical stirrer for 3 hrs. The pH of the so obtained gel was maintained at 5.2 over the time interval of 2 hours by treating it with 45 ml of 1:1 nitric acid (depending on initial gel pH). The treated gel was then aged at 80° C. for 24 hours to obtain precipitated alumina which was then filtered, washed with water and dried at 110° C. for 10 hours. The so obtained dried precipitated alumina was then calcined at 450° C. for 4 hours to obtain calcined alumina powder. The synthesized calcined alumina powder was characterized using XRD and BET.

The alumina powder was synthesized maintaining the proportion of Al (source):templating agent:water=1:0.05:45.

Surface area of the calcined powder using various templating agents is provided in Table 1:

TABLE 1

| Templating agent | *SA (m²/gm) | **PV (cc/gm) | ***APD (Å) |
|---|---|---|---|
| CTAB | 339 | 1.32 | 140 |
| TPABr | 368 | 1.44 | 134.4 |
| TEABr | 379 | 1.59 | 167 |
| TBABr | 392 | 1.57 | 134 |
| P-123 | 400 | 1.60 | 146 |
| Stearic Acid | 403 | 1.48 | 126 |
| HMDA | 421 | 1.37 | 106 |
| Starch | 355 | 1.32 | 150 |
| Ethylene Glycol | 302 | 0.75 | 99.77 |
| PVA | 263.1 | 0.65 | 99.00 |

*SA—Surface area;
**PV—pore volume;
***APD—Average pore diameter

Based on the results of surface area, pore volume and pore diameter obtained after calcination and easiness in handling, TEABr was considered for detailed parametric effect studies.

The study was carried out to confirm the best calcination temperature, effect of pH, the effect of the amount of the templating agent and the effect of temperature for the preparation of alumina powder.

Experiment 1a: Effect of Mole Ratio of Templating Agent

Experiment 1 was repeated by varying the molar ratio of the templating agent with respect to alumina source and water used in the preparation of calcined alumina.

TABLE 2

| Molar ratio | SA (m²/g) | PV (cm³/g) | PD (Å) |
|---|---|---|---|
| 0 | 321 | 1.29 | 144 |
| 0.05 | 342 | 1.59 | 155 |
| 0.1 | 356 | 1.51 | 162 |
| 0.2 | 341 | 1.42 | 160 |

It is clearly seen from Table 2 that there is not much change in the textural properties of calcined alumina by varying the molar ratio of templating agent in respect of alumina source and water used in the preparation of calcined alumina. Hence, 0.05 molar ratio was fixed/preferred for further studies.

Experiment 1 b: Effect of Temperature

Effect of heat treatment/temperature on textural properties of alumina was also studied. The following table illustrates the effect of temperature on textural properties.

TABLE 3

| Temperature ° C. | SA (m²/g) | PV (cm³/g) | PD (Å) |
|---|---|---|---|
| 60 | 294 | 1.34 | 183 |
| 80 | 342 | 1.59 | 175.2 |
| 100 | 300 | 0.83 | 110 |
| 110 | 292 | 0.82 | 112 |

The optimized temperature was found to be 80° C. It was further found that the surface area, pore volume, and pore diameter decreased with increase in the temperature above 80° C.

Experiment 1c—Effect of Calcination Temperature

Alumina powder was calcined at various temperatures to understand the effect of calcination temperature on its physical properties like surface area, pore volume, and pore diameter. Powder was calcined at 450° C., 500° C. and 550° C. for 4 hours. Table-4 provides the effect of calcination temperature (time 4 hr) on surface area.

TABLE 4

| Calcination temperature | SA (m²/g) | PV (cm³/g) | PD (Å) |
|---|---|---|---|
| 450° C. | 379 | 1.59 | 167 |
| 500° C. | 341 | 1.48 | 184.7 |
| 550° C. | 312 | 1.35 | 198.8 |

Preferred calcination temperature was found to be 450° C. It is clearly seen from table 4 that upon increasing the calcination temperature, there was a decrease in the surface area, and pore volume; however, an increase in the pore diameter was observed.

Experiment 1d: Effect of pH

The effect of pH is clearly seen from the table below i.e., Table 5. As the pH of final gel was increased from 4 to 7, the surface area and pore volume increased; whereas at pH 9.7 the surface area and pore volume started decreasing.

TABLE 5

| pH of gel | SA (m²/g) | PV (cm³/g) | PD (Å) |
|---|---|---|---|
| 4 | 326 | 0.68 | 83.4 |
| 5.2 | 342 | 1.59 | 175.2 |
| 7 | 390 | 1.55 | 174.9 |
| 9.7 | 376 | 1.36 | 144.5 |

Experiment 2: Preparation of Alumina Extrudate in Accordance with the Process of the Present Disclosure:

Uncalcined powder of alumina or calcined alumina, synthesized using CTAB as templating agent, was first sieved to get 85 g Uncalcined powder of alumina or calcined alumina of less than 250 micron particle size. The so obtained sieved alumina powder was transferred to a Mix-Muller where 123 ml of binder solution (0.3% PVA+2.5% GAA) was added in a drop-wise manner to obtain a dough. Various concentrations of binder solution were prepared and used for making dough. Various ratios of the powder to the binder solution were also studied and the same is provided in table 6.

The so obtained dough was mulled for 4 hours for homogenous mixing. The dough was then transferred to an extruder hopper for extrusion through extruder dies having 1 to 3 mm diameter with cylindrical, trilob, quadra lob, and star shape. Extrudates were dried at 110° C. for 12 hours and dried extrudates were then calcined at 450° C. for 4 hours. The calcined extrudates were characterized for the BET surface area and pore volume, single grain crushing strength by ASTM D4179-11.

TABLE 6

| Conc. of binder solution | Amt. of stock sol used for 85 g alumina powder extrusion | CS (daN/mm) | SA (m²/g) | PV (cm³/g) | PD (Å) |
|---|---|---|---|---|---|
| Uncalcined alumina Powder | | | 383.87 | 1.37 | 142 |
| 0.3% PVA (polyvinyl alcohol) + 2.5% GAA (Glacial acetic acid) | 123 ml | 2.37 | 368 | 0.80 | 88.00 |
| 1.5% HNO₃ | 110 ml | 1.89 | 295 | 0.74 | 100.00 |
| 2.5% Oxalic Acid | 110 ml | 1.81 | 321 | 0.83 | 104.00 |
| 0.3% PVA (polyvinyl alcohol) | 110 ml | 1.91 | 378 | 1.01 | 107.00 |
| 0.3% PVA + 2.5% Oxalic Acid | 114 ml | 1.74 | 340 | 0.87 | 102.00 |
| 2.5% Starch | 106 ml | 2.43 | 326 | 0.84 | 103.00 |
| 0.3% PVA + 2.5% Citric Acid | 114 ml | 2 | 342 | 0.84 | 99.00 |
| 0.3% PVA + 2.5% NH₄OH | 106 ml | N.A. | 325 | 0.69 | 85.00 |
| 2.5% EG(ethylene glycol) | 106 ml | N.A. | 393 | 0.89 | 91 |
| 3% Glycerine | 110 ml | N.A. | 420 | 1.11 | 106 |
| 0.075 PVA + 0.25 Acetic acid (extrudate prepared using uncalcined alumina powder) | 136 ml | | 336 | 0.82 | 103 |
| 0.075 PVA + 0.25 Acetic acid (extrudate prepared using calcined alumina powder) | 141 ml | 2.05 | 338.61 | 1.05 | 98.51 |

*CS—crushing strength;
*SA—Surface area;
*PV—pore volume;
*PD—pore diameter
*N.A.—could not determine Extrudates prepared using starch and glycerin broke down to small pieces during calcination, which resulted in loss in the crushing strength. The above analysis clearly indicates that the alumina extrudates with calcined powder and PVA+ acetic acid as binder exhibited the highest BET properties with better crushing strength.

Experiment 2a:

Extrusion using 0.1% PVA+0.5% GAA of calcined alumina powder prepared using TEABr as templating agent ended in having surface area of 348 m²/g, pore volume of 1.2 cm³/g, and average pore diameter of 126 Å (Table 7). The amount of stock solution (PVA and glacial acetic acid) used during extrusion was 140 ml when 85 g of calcined alumina powder was used, hence the ratio of alumina:binder stock solution was 1:1.65.

TABLE 7

| Optimized binder ratio | Amt. of stock sol used for 85 g alumina powder extrusion | SA (m²/gm) | PV (cm³/g) | PD (Å) |
|---|---|---|---|---|
| Calcined alumina powder | | 379 | 1.59 | 167 |
| 0.1% PVA + 0.5% GAA (extrudates of calcined powder) | 140 ml | 348 | 1.20 | 126 |
| 0.1% PVA + 0.5% GAA (extrudates of Un-calcined powder) | 136 ml | 370 | 1.10 | 118 |
| Commercial alumina extrudate | | 264 | 0.86 | 131 |

Alumina powder before and after calcination was also characterized by X-ray diffraction for phase identification.

The pore diameter distribution of calcined powder and extrudate shows that the pore diameter varies in the range of 50-500 Å with an average pore diameter in the range of 150 Å-170 Å and 120 Å-140 Å respectively.

Experiment 3: Activity/Properties of Alumina Extrudate and Comparison with Commercial Alumina Supported Catalyst:

Alumina extrudates synthesized in experiment 2 were used for hydrotreating catalyst preparation and was compared with commercially available alumina extrudes having surface area 264 $m^2/g$, pore volume 0.86 cc/gm and average pore diameter 131 Å using nickel, cobalt and molybdenum as active metal centres. Below are the hydrodesulfurization results for diesel using these catalysts. The results obtained clearly indicate that due to better textural properties of alumina prepared using the current methodology provided better accessability to molecule to react with active metal centre. Sulfur in feed was 10763.4 ppm

TABLE 8

| Catalyst | Sulfur, ppm | |
|---|---|---|
| | 350° C. | 360° C. |
| NiCoMo—Al support | 228.1 | 203.34 |
| NiCoMo-Commercial support | 4209 | 3228.1 |

It is evident from the results in table 8 that the catalyst prepared using the process of the present disclosure shows better sulfur removal activity compared to commercially available alumina extrudate catalyst. This may be attributed to high surface area and pore volume resulting in higher metal dispersion.

Further, due to better textural properties of the alumina material of the present disclosure, the alumina material (either in powder form or in extrude form) can be utilized as a support in catalyst preparation for hydrocracking, reforming, converting syngas to olefins and Fluid catalytic cracking (FCC).

Technical Advances and Economical Significance

The present disclosure described herein above has several technical advantages including, but not limited to, a process for preparation of alumina and alumina extrudates wherein:
  better dispersion of active metals as well as higher loading of metals on alumina and/or alumina extrudates is achieved due to enhanced surface area and pore volume of alumina and alumina extrudates; and
  alumina prepared by the process of the present disclosure can also be used as an adsorbent for entrapping impurities.

The foregoing description of the specific embodiments so fully reveals the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A process for preparing alumina having surface area in the range of 330-400 $m^2/g$, pore volume in the range of 1.2-1.7 cc/g, and average pore diameter in the range of 125-167 Å, said process comprising the following steps:
  a. mixing at least one alumina source in water to obtain an aqueous mixture;
  b. mixing at least one templating agent in said aqueous mixture under stirring to obtain a gel;
  c. adjusting pH of said gel in the range of 4-10 followed by maintaining said pH, for a time period in the range of 1 hour to 3 hours, to obtain a pH adjusted gel;
  d. aging said pH adjusted gel at a temperature in the range of 60° C. to 120° C. to obtain a precipitate;
  e. filtering said precipitate followed by washing with water, and drying to obtain a dried precipitate; and
  f. calcining said dried precipitate to obtain alumina,
  wherein the amount of said templating agent is in the range of 0.05 to 0.2 mole ratio of said alumina wherein said templating agent is at least one selected from the group consisting of cetyltrimethylammonium bromide (CTAB), tetraethylammonium bromide (TEABr), tetrapropylammonium bromide (TPABr), and tetrabutylammonium bromide (TBABr).

2. The process as claimed in claim 1, wherein said alumina source is at least one selected from the group consisting of aluminium hydroxide, aluminium nitrate, aluminium sulphate, aluminium iso-butoxide, and aluminium iso-propoxide.

3. The process as claimed in claim 1, wherein said pH of said gel is adjusted by adding at least one mineral acid selected from the group consisting of nitric acid, hydrochloric acid, and sulfuric acid; or ammonia.

4. The process as claimed in claim 1, wherein the molar proportion of said alumina source:said templating agent:water is in the range of 1:0.05:20 to 1:0.05:60.

5. The process as claimed in claim 1, wherein the process further comprises a process for preparing alumina extrudates wherein said-alumina extrudates have a surface area in the range of 300-360 m$^2$/g, pore volume in the range of 0.8-1.3 cc/g, average pore diameter in the range of 90-130 Å and single grain crushing strength in the range of 1 daN/mm to 2.5 daN/mm, said process comprising:
  i. mixing said dried precipitate obtained in step (e) or said alumina obtained in step (f) of claim 1, with a binder solution to obtain a dough;
  ii. extruding said dough to obtain extrudates; and
  iii. drying said extrudates followed by calcination to obtain said alumina extrudates.

6. The process for preparing alumina extrudates as claimed in claim 5, wherein said binder is at least one selected from the group consisting of polyvinyl alcohol, ethylene glycol and starch.

7. The process for preparing alumina extrudates as claimed in claim 5, wherein said binder solution further comprises at least one carboxylic acid selected from the group consisting of acetic acid, oxalic acid, stearic acid, and citric acid.

8. The process for preparing alumina extrudates as claimed in claim 5, wherein said extrudates are in a form selected from the group consisting of cylindrical, trilob, quadra lob, and star shaped.

* * * * *